(12) United States Patent
Yoshino

(10) Patent No.: US 9,989,407 B2
(45) Date of Patent: Jun. 5, 2018

(54) OPTICAL RECEIVER AND CONTROL METHOD THEREOF

(71) Applicant: NEC Corporation, Minato-ku, Tokyo (JP)

(72) Inventor: Ken-ichiro Yoshino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 297 days.

(21) Appl. No.: 14/766,667

(22) PCT Filed: Feb. 24, 2014

(86) PCT No.: PCT/JP2014/000947
§ 371 (c)(1),
(2) Date: Aug. 7, 2015

(87) PCT Pub. No.: WO2014/132609
PCT Pub. Date: Sep. 4, 2014

(65) Prior Publication Data
US 2015/0369657 A1    Dec. 24, 2015

(30) Foreign Application Priority Data

Feb. 27, 2013    (JP) ................................. 2013-036506

(51) Int. Cl.
G01J 1/26       (2006.01)
G01J 1/44       (2006.01)
G01J 1/04       (2006.01)
G01J 1/16       (2006.01)
G01J 1/42       (2006.01)

(52) U.S. Cl.
CPC .............. *G01J 1/0418* (2013.01); *G01J 1/16* (2013.01); *G01J 1/26* (2013.01); *G01J 1/4228* (2013.01); *G01J 2001/442* (2013.01); *G01J 2001/444* (2013.01)

(58) Field of Classification Search
CPC .... G01J 1/0418; G01J 1/16; G01J 1/26; G01J 1/4228; G01J 2001/442; G01J 2001/444
See application file for complete search history.

(56) References Cited

FOREIGN PATENT DOCUMENTS

| JP | 2003036168 A | 2/2003 |
| JP | 2006284202 A | 10/2006 |
| JP | 2007187698 A | 7/2007 |
| JP | 2009515421 A | 4/2009 |

OTHER PUBLICATIONS

International Search Report for PCT Application No. PCT/JP2014/000947, dated May 27, 2014.
English translation of Written opinion for PCT Application No. PCT/JP2014/000947.
Bennett and Brassard, IEEE Int. Conf. on Computers, Systems, and Signal Processing, Bangalore, India, p. 175, Dec. 9-12, 1984.
M. Sasaki et al., "Field test of quantum key distribution in the Tokyo QKD Network" Optics Express, May 23, 2011 vol. 19, 10387.

*Primary Examiner* — Renee Chavez

(57) ABSTRACT

(Object) To provide an optical receiver and a control method thereof that enable equalization of both the quantum efficiencies and the dark count probabilities of multiple photon detectors.

(Solving Means) An optical receiver includes multiple photon detectors, a first equalizing means that equalizes either dark count probabilities or quantum efficiencies of the multiple photon detectors, and a second equalizing means that equalizes the other ones without affecting the equalization by the first equalizing means.

8 Claims, 10 Drawing Sheets

OPTICAL RECEIVER AND CONTROL METHOD THEREOF

This application is a National Stage Entry of PCT/JP2014/000947 filed on Feb. 24, 2014, which claims priority from Japanese Patent Application 2013-036506 filed on Feb. 27, 2013, the contents of all of which are incorporated herein by reference, in their entirety.

TECHNICAL FIELD

The present invention relates to an optical receiver and a control method thereof.

BACKGROUND ART

In recent years, quantum key distribution (QKD) as a method for enabling cryptographic communications that are information-theoretically secure against wiretapping is actively researched (NPL 1), and development aiming at practical use of QKD is advancing.

In QKD, a "single photon", which only includes a single photon per pulse, (or a "pseudo single photon", which is obtained by attenuating a general laser beam to the utmost extent) is used as a communication medium, and therefore, a photon detector capable of detecting single photons is used instead of a photodetector as one employed in general optical communications. As such a photon detector, an avalanche photodiode (APD), to which a bias exceeding a breakdown voltage is applied, or a superconducting device cooled to several K is generally used.

Although various QKD systems have been suggested, a general system is the one in which two or four photon detectors are used (refer to NPL 2, for example). In the case of employing multiple photon detectors, it is desired that the characteristics of all the photon detectors are as uniform as possible in order to guarantee the security of a cipher key generated by QKD, however, in general, the characteristics of APD devices and superconducting devices vary greatly and also change due to, for example, environmental temperature fluctuation and deterioration of the devices. Accordingly, in the case where QKD operates over a long time period, it is necessary to equalize the characteristics by regularly checking the characteristics and individually adjusting external parameters such as bias voltages.

Examples of major parameters representing the characteristics of a photon detector are quantum efficiency and dark count probability. Quantum efficiency is a probability that a photon detector correctly outputs a detection signal upon receipt of a pulse including a single photon (photon detection probability). Dark count probability is a probability of erroneously outputting a detection signal although no photon is included, and represents the magnitude of noise. Typical values of quantum efficiency and dark count probability are approximately 10% and $10^{-5}$, respectively.

As a method of equalizing the characteristics of multiple photon detectors, there is a method of estimating the difference in quantum efficiency on the basis of the variance in measured detection data and adjusting bias voltages or the like of the detectors so as to eliminate the variance (PTL 1). FIG. 10 is a block diagram illustrating this technique. This optical receiver includes: multiple photon detectors 201 (two, i.e., 201a and 201b, in this example); a bias voltage control means 202, which controls bias voltages of the photon detectors 201; and a detection number determining means 203, which counts the number of photons in an output from each of the photon detectors 201. In this device, when signal beams 204a and 204b are input and a variance in the number of detections between the two photon detectors 201a and 202b is found, the bias voltage control means 202 adjusts the bias voltages of the two photon detectors 201, consequently eliminating the variance. In other words, the quantum efficiencies of the multiple photon detectors 201 may be equalized.

CITATION LIST

Patent Literature

[PTL 1] Japanese Patent Publication No. 4883273

Non Patent Literature

[NPL 1] Bennett and Brassard, IEEE Int. Conf. on Computers, Systems, and Signal Processing, Bangalore, India, p. 175, 1984

[NPL 2] M. Sasaki et al., "Field test of quantum key distribution in the Tokyo QKD Network" Opt. Express, 19, 10387 (2011)

SUMMARY OF INVENTION

Technical Problem

By use of known methods, it is possible to equalize the quantum efficiencies of detectors, but it is difficult to equalize the dark count probabilities of the detectors. Since no security theory has been established for the case in which detectors have different dark count probabilities, up to the present time, equalization of dark count probabilities is essential.

In view of the above, an object of the present invention is to provide an optical receiver and a control method thereof that enable equalization of both the quantum efficiencies and dark count probabilities of multiple photon detectors.

Solution to Problem

To solve the above-described problem, an optical receiver according to the present invention is characterized by including a first equalizing means that equalizes either dark count probabilities or quantum efficiencies of multiple optical detectors, and a second equalizing means that equalizes the other ones without affecting the equalization by the first equalizing means.

Advantageous Effects of Invention

According to the present invention, it is possible to equalize the quantum efficiencies and dark count probabilities of multiple photon detectors at the same time.

DESCRIPTION OF EMBODIMENTS

The present invention is described below in detail with reference to the drawings.

First Exemplary Embodiment

Figure 1:
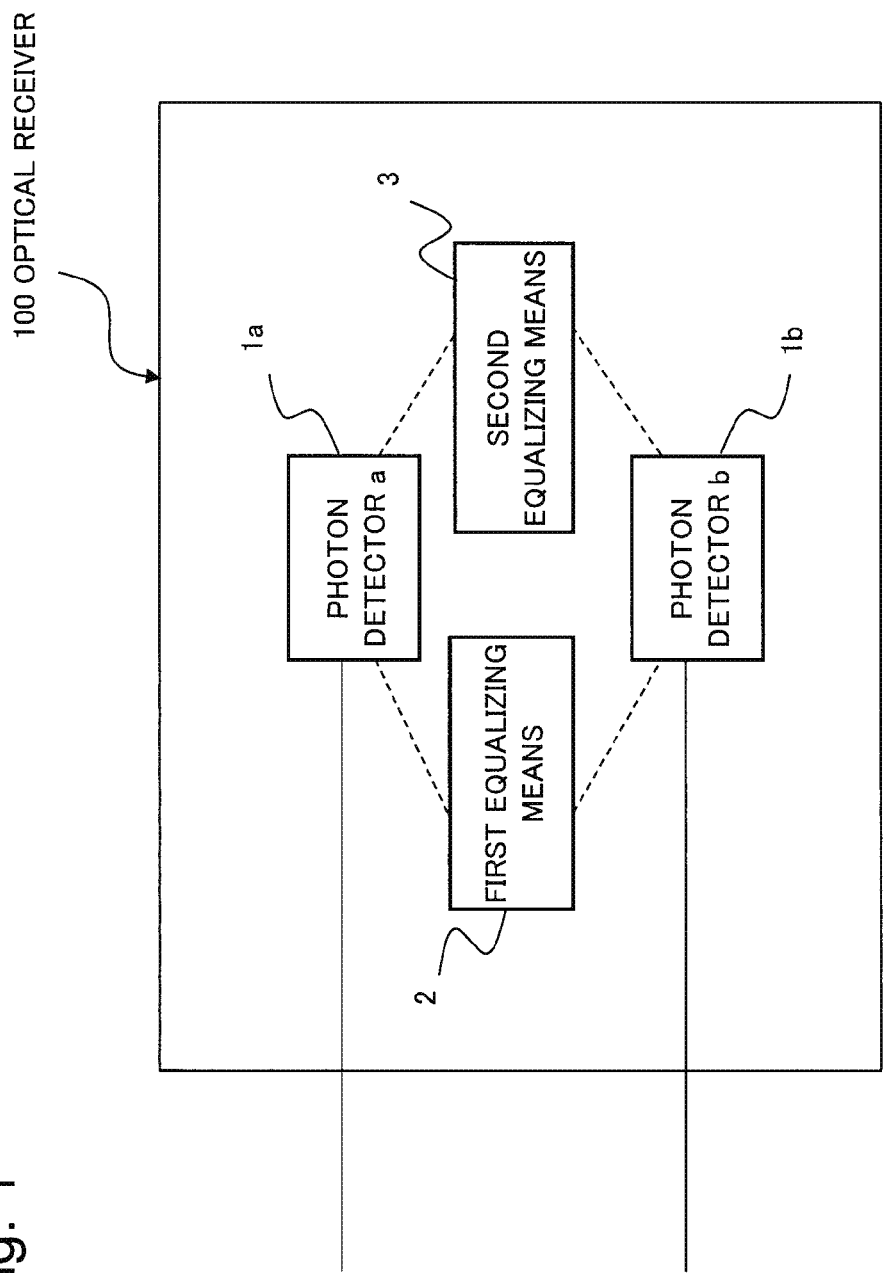
FIG. 1 is a block diagram illustrating a configuration of a first exemplary embodiment of the present invention.

FIG. 1 is a block diagram illustrating a first exemplary embodiment of the present invention. An optical receiver 100 of this exemplary embodiment includes: multiple photon detectors 1 (1a and 1b); a first equalizing means 2, which equalizes either the dark count probabilities or the quantum efficiencies of the multiple photon detectors; and a second equalizing means 3, which equalizes the other ones without affecting the equalization by the first equalizing means 2. According to this exemplary embodiment, it is possible to equalize both the quantum efficiencies and dark count probabilities of multiple photon detectors at the same time.

Second Exemplary Embodiment

Figure 2:
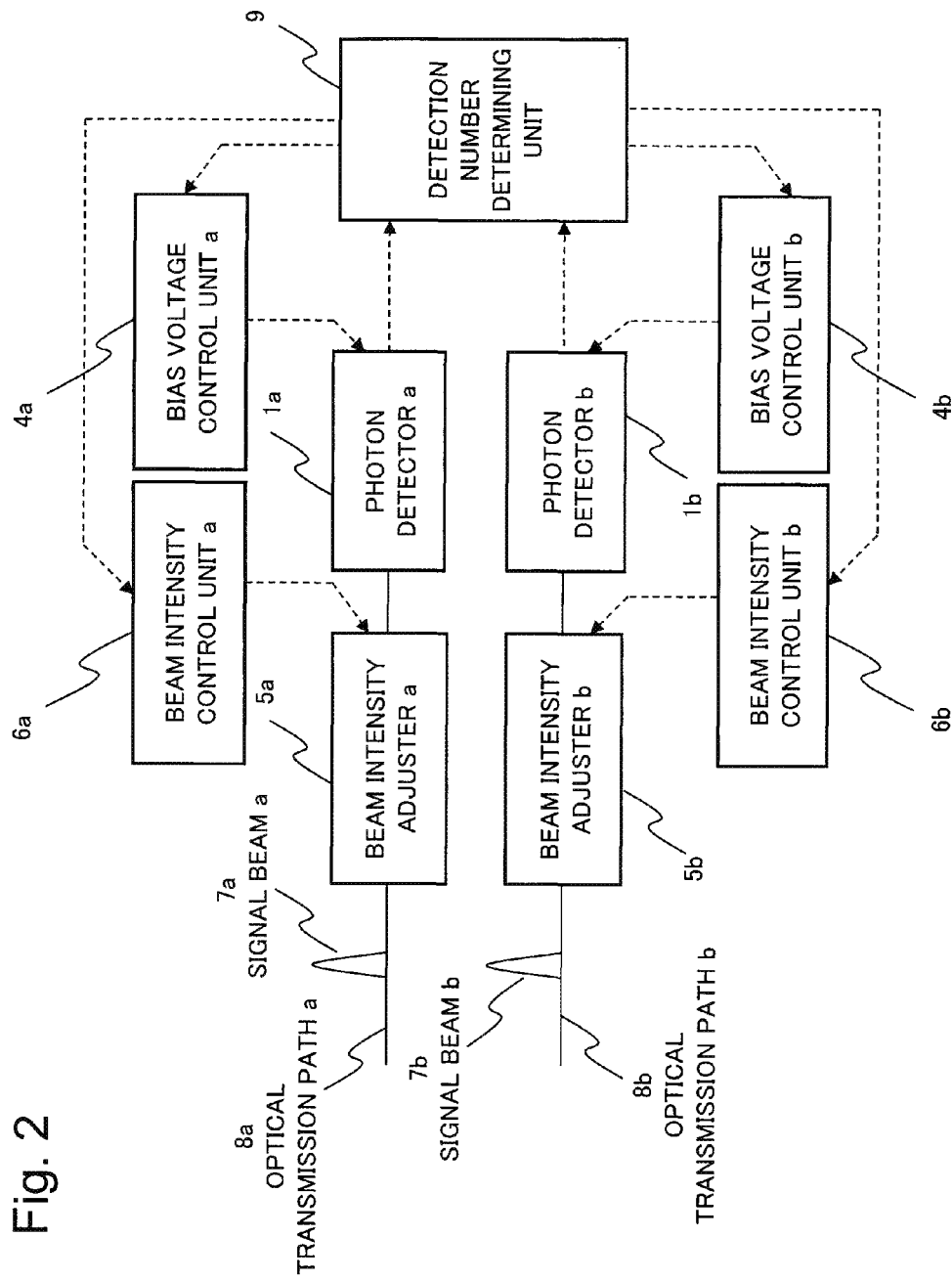
FIG. 2 is a block diagram illustrating a configuration of a second exemplary embodiment of the present invention.

FIG. 2 is a block diagram illustrating an optical receiver 100 according to this exemplary embodiment. The optical receiver 100 of this exemplary embodiment includes multiple detection systems. Each of the detection systems includes: a photon detector 1; a bias voltage control means 4, which controls the bias voltage of the photon detector 1; and a beam intensity adjusting means 5, which adjusts the intensity of a beam that is to enter the photon detector 1. In addition, each of the detection systems includes: a beam intensity control means 6, which controls the beam intensity adjusting means 5; and an optical transmission path 8, in which a signal beam 7 travels to the detection system. The optical receiver 100 includes a detection number determining means 9, which is connected to each of the photon detectors 1, bias voltage control means 4, and the beam intensity control means 6. The detection number determining means 9 calculates the number of photons detected by each of the photon detectors 1 and controls each of the bias voltage control means 4 and each of the beam intensity control means 6. The optical transmission paths 8 are optical waveguides such as optical fibers in many cases but may be empty spaces.

In the following, description is given of a case of a detection system configured with dual systems as an example. One of the detection systems includes a photon detector 1a, a bias voltage control means 4a, a beam intensity adjusting means 5a, a beam intensity control means 6a, and an optical transmission path 8a. The other detection system includes a photon detector 1b, a bias voltage control means 4b, a beam intensity adjusting means 5b, a beam intensity control means 6b, and an optical transmission path 8b.

Figure 3:
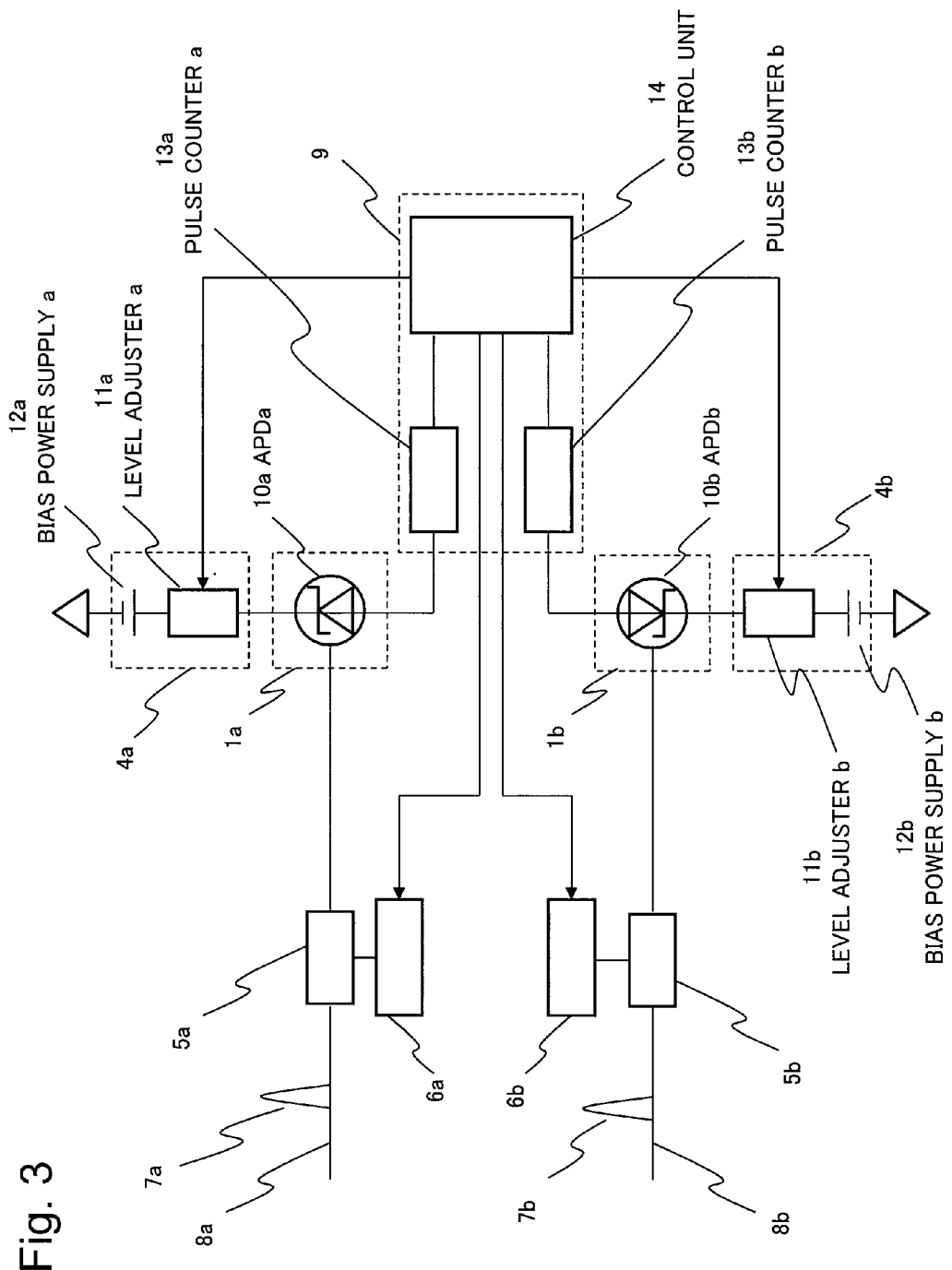
FIG. 3 is a block diagram illustrating an example of the second exemplary embodiment of the present invention.

FIG. 3 is a block diagram illustrating a concrete example of a configuration of the optical receiver. An APD 10 (avalanche photodiode) is used as each of the photon detectors 1. When a photon enters the APD 10 that is inversely biased, an avalanche of carriers are generated, so that a large current flows. This amplification effect enables highly sensitive detection of photons. And the sensitivity depends on bias voltage. In this exemplary embodiment, the APD 10 is connected to a bias power supply 12 via a level adjuster 11. The other end of the APD 10 is connected to a pulse counter 13. The level adjuster 11 is controlled by a control means 14, which is provided in the detection number determining means 9, and adjusts the bias to be applied to the APD 10.

The pulse counter 13 counts, as pulses, a current generated at the APD 10, by using a means of current-voltage conversion. The pulse counter 13 is connected to the control means 14, and the control means 14 calculates the number of photons on the basis of the detected pulses.

A general beam intensity adjusting means can be used as the beam intensity adjusting means 5. For example, a variable optical attenuator (VOA) based on electro-optical effect or magneto-optical effect, an electro-absorption modulator (EA modulator), or a Mach-Zehnder modulator (MZ modulator) may be used. Since the operations and the usages of these devices are known, details thereof are not described here. Each of the devices can adjust beam intensity by way of electrical control. In this example, the beam intensity adjusting means 5 is controlled by the beam intensity control means 6. The beam intensity control means 6 is controlled by the control means 14.

Next, photon detection operation of the optical receiver is described. Although the detection system is configured with dual systems in this exemplary embodiment, description is given by use of one system a since operations of the dual systems are the same. First, a signal beam 7a enters the beam intensity adjusting means 5a through the optical transmission path 8a. Then, the signal beam 7a is attenuated by the beam intensity adjusting means 5a and enters the APD 10a. Upon entrance of photons, a pulsed current flows into the APD 10a. The current is counted as pulses by the pulse counter 13a. The control means 14 calculates the number of detected photons on the basis of the pulse count.

Next, description is given of a "method of equalizing the dark count probabilities of the multiple photon detectors 1" and a "method of equalizing the quantum efficiencies without affecting the dark count probabilities" that are aspects of the present invention.

Figure 4:
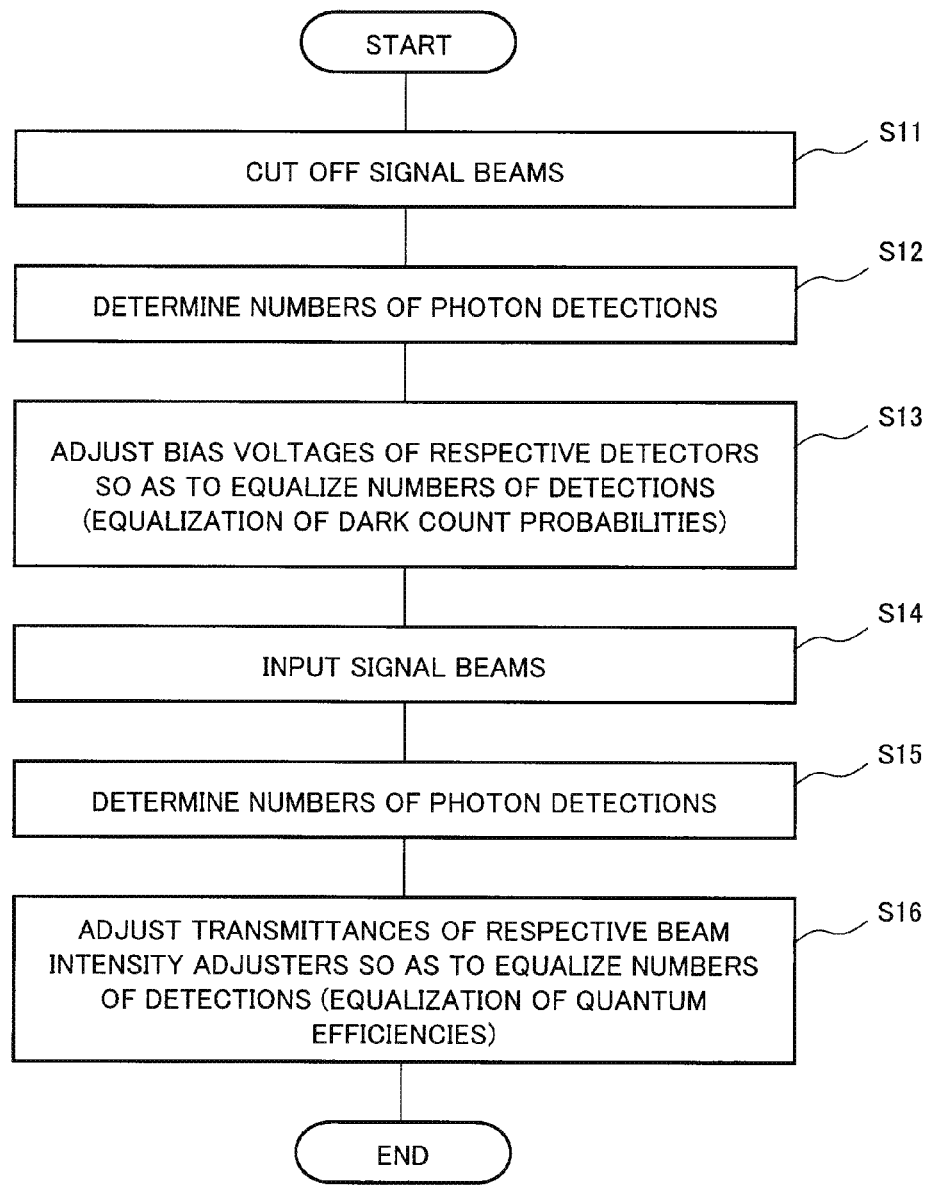
FIG. 4 is a flowchart illustrating a procedure of the second exemplary embodiment of the present invention.

FIG. 4 is a flowchart illustrating a procedure of the methods. First, signal beams 7 are cut off (S11). Then, the detection number determining means 9 determines the number of detections of each of the photon detectors 1 (APDs 10) (S12). This number corresponds to dark count probability. Then, each of the bias voltage control means 4 (level adjusters 11) controls the bias voltage to be applied to the corresponding photon detector 1 and thereby adjusts the sensitivity so that the numbers of detections of the respective photon detectors 1 are to be equal. In this way, the dark count probabilities can be equalized (S13). At this stage, the quantum efficiencies are different in general due to individual variability of the photon detectors 1. Subsequently, the signal beams 7 are input (S14). The number of detections of each of the photon detectors 1 is determined in this state (S15). Since the quantum efficiencies of the detectors are different, the number of detections of the respective detectors are not equal in general. Accordingly, the beam intensity is adjusted so that the transmittance of the beam intensity adjusting means 5 corresponding to the photon detector 1 having the larger number of detected photons decreases, in order to equalize the numbers of detections (S16). In this way, the effective quantum efficiencies can be equalized. In this procedure, the operation performed on the beam intensity adjusting means 5 does not affect the dark count probabilities. Hence, it is possible to equalize both quantum efficiencies and the dark count probabilities at the same time through the above procedure. Note that this exemplary embodiment is applicable not only to the case of including dual systems but also to the case of including three or more systems.

Third Exemplary Embodiment

In this exemplary embodiment, a superconducting single photon detector (SSPD) 15 is used as each photon detector 1. The SSPD 15 is a photon detector using a superconductor, and an overview of operation of the SSPD 15 is as follows. In a state where a thin wire formed of a superconductor is kept in a superconducting state, a bias is applied to the thin wire, so that a current flows in a state of having no resistance. When a photon enters the thin wire in this state, the superconducting state is locally destroyed, and a resistance occurs. By detecting a voltage pulse generated as a consequence of the resistance change, a photon may be detected.

Figure 5:
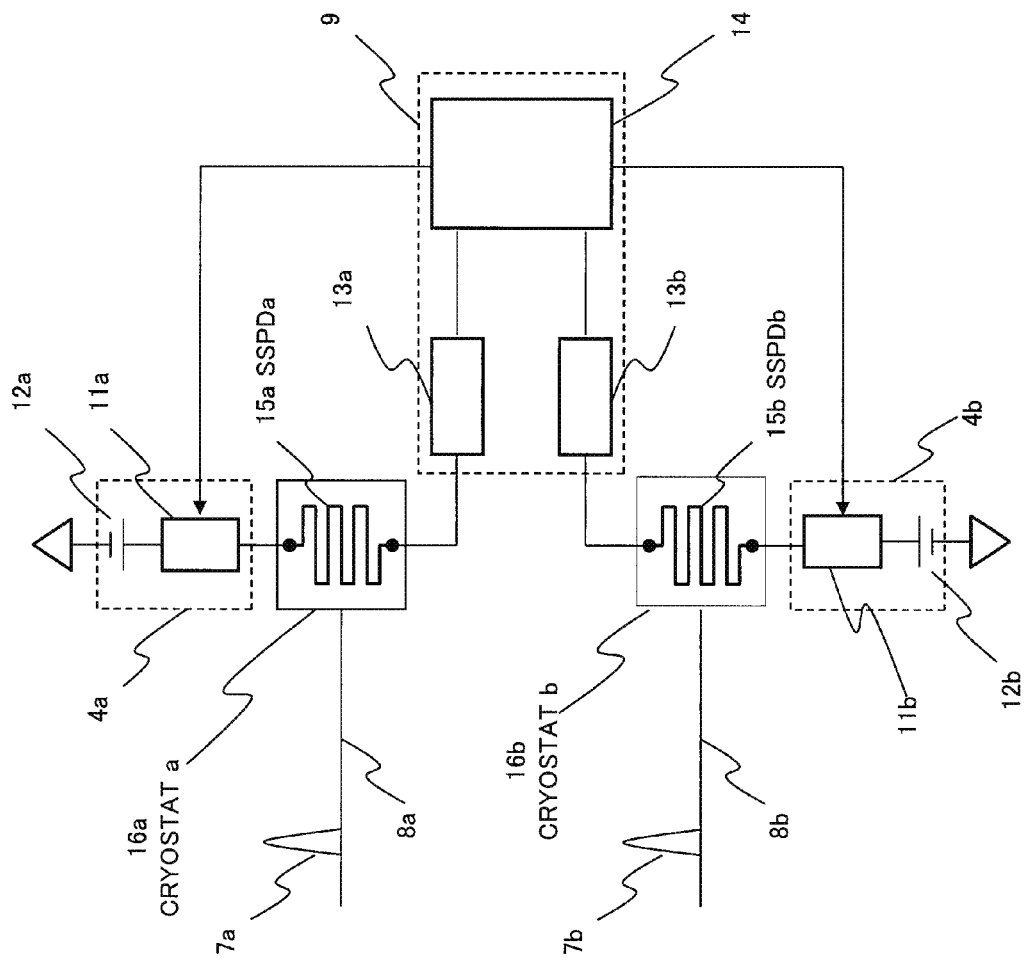
FIG. 5 is a block diagram illustrating a configuration of a third exemplary embodiment of the present invention.

FIG. 5 is a block diagram illustrating the third exemplary embodiment of the present invention. Two SSPDs 15, i.e., 15a and 15b, are provided as the photon detectors 1. The SSPDs 15a and 15b are cooled respectively by cryostats 16a and 16b so as to each be in a superconducting state. The SSPDs 15 are connected to a bias power supply 12 via respective level adjusters 11. The other ends of the SSPDs 15 are connected to respective pulse counters 13. Since the configurations of the beam intensity adjusting means 5 and the beam intensity control means 6 are the same as those of the second exemplary embodiment, description thereof is omitted.

As is clear from the above description, the APDs 10 of the second exemplary embodiment are replaced with the SSPDs 15 in the above configuration. In addition, the operation is the same as that of the second exemplary embodiment in that voltage pulses generated in each of the SSPDs 15 are counted by the corresponding one of the pulse counters 13. Obviously, however, individual conditions such as bias voltages are different from those of the second exemplary embodiment.

The sensitivities of the SSPDs 15 used in this exemplary embodiment vary according to bias voltage as the APDs 10. Accordingly, by adjusting bias voltages, it is possible to equalize the dark count probabilities of the multiple photon detectors 1 and to equalize the quantum efficiencies without affecting the dark count probabilities, by using the same methods as those of the first exemplary embodiment.

As clear from the above description, the present invention is applicable not only to the APDs 10 or SSPDs 15 but also similarly to any photon detectors that are operated by application of voltages and the sensitivities of which depend on bias voltage.

Fourth Exemplary Embodiment

Figure 6:
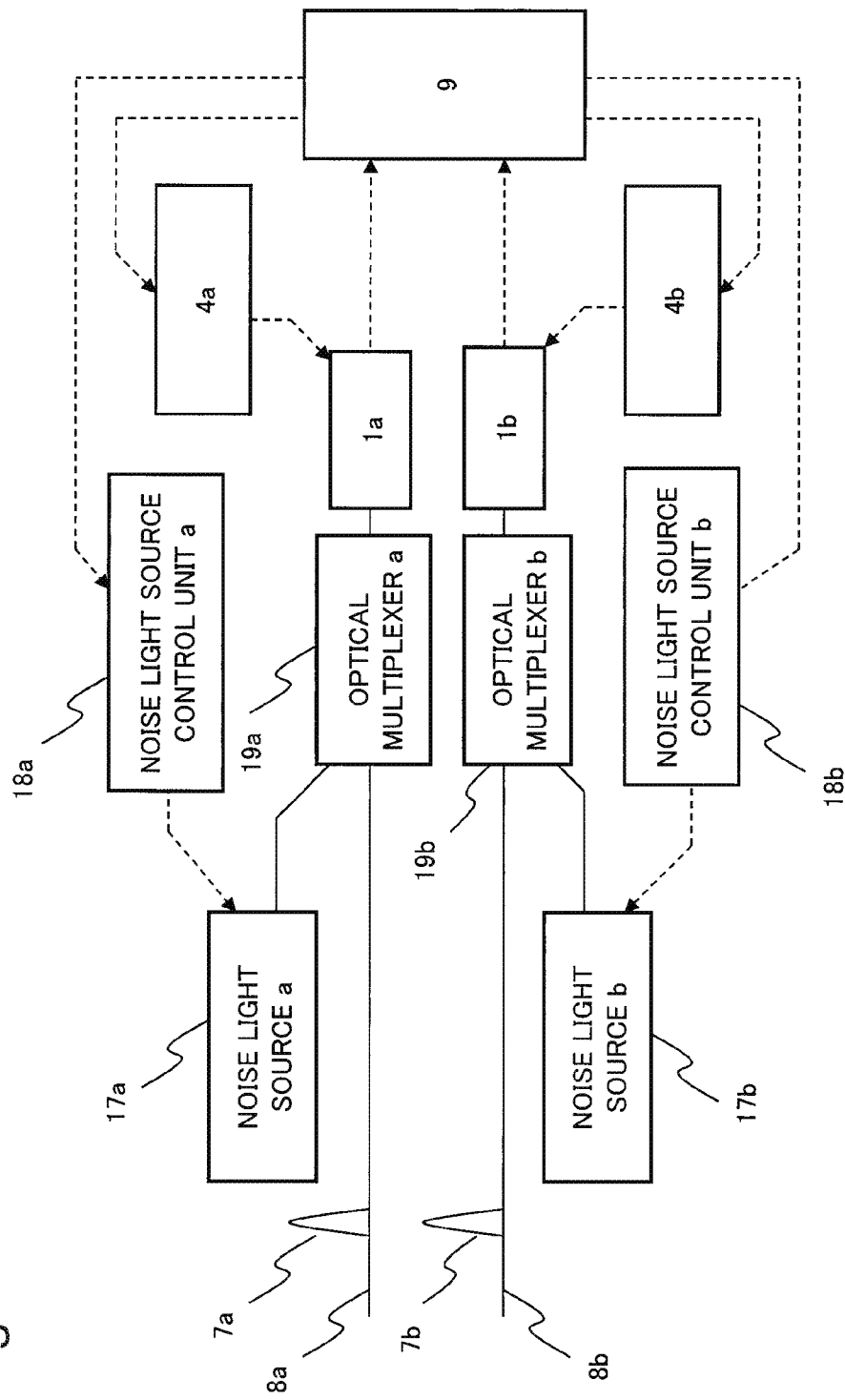
FIG. 6 is a block diagram illustrating a configuration of a fourth exemplary embodiment of the present invention.

FIG. 6 is a block diagram illustrating a fourth exemplary embodiment. In this exemplary embodiment, at a stage prior to the photon detector 1 in each detection system, a noise light source 17, a noise light source control means 18, and an optical multiplexer 19 are provided. The noise light source 17 is a light source that produces beams each having a wavelength corresponding to the sensitivity of the photon detector 1 and is, for example, a general continuous-wave laser. The noise light source control means 18 controls the intensity of beams emitted by the noise light source 17. The optical multiplexer 19 is connected to the optical transmission path 8 and the noise light source 17 and multiplexes beams received from the optical transmission path 8 and the noise light source 17. In order to reduce the loss of the signal beam 7, the optical multiplexer 19 is desired to be an optical multiplexer having, for example, a branching ratio of 99:1 where signal corresponds to 99 and noise corresponds to 1. The configurations of the photon detectors 1 and the bias voltage control means 4 are the same as those of the second and third exemplary embodiments.

Next, photon detection operation of the optical receiver of this exemplary embodiment is described. The signal beam 7 transmitted in the optical transmission path 8 and a beam from the noise light source 17 are multiplexed in the optical multiplexers 19. Then, the beam obtained by the multiplexing is input to the photon detector 1. The detection number determining means 9 calculates the number of photon detections in an output from the photon detector 1.

Next, description is given of a "method of equalizing the quantum efficiencies of the multiple photon detectors 1" and a "method of equalizing the dark count probabilities without affecting the quantum efficiencies" that are aspects of this exemplary embodiment.

In this exemplary embodiment, first, the quantum efficiencies of the respective photon detectors 1 are equalized. First of all, only the signal beams 7 are input to the respective photon detectors 1 without driving the noise light sources 17. At this stage, the numbers of detections of the respective photon detectors 1 vary. By adjusting bias voltages through operation of the respective bias voltage control means 4, the outputs may be equalized. This corresponds to a "means that equalizes quantum efficiencies".

When the bias voltages are changed, both the quantum efficiencies and the dark count probabilities change at the same time. In view of this, the dark count probabilities are equalized next. In each of the multiple detection systems, a beam from the noise light source 17 is detected by the detection number determining means 9 even in a state of receiving no signal beam 7. Accordingly, the beam can be used for dark count. In each detection system, the signal beam 5 is cut off so that only a beam from the noise light source 17 is input to the photon detector 1. Then, through the operation of the respective noise light source control means 18, the beam intensities of the respective noise light sources 17 are adjusted so as to equalize the numbers of detections of the respective photon detectors 1. In this way, the equalization of the dark count probabilities is completed.

Figure 7:
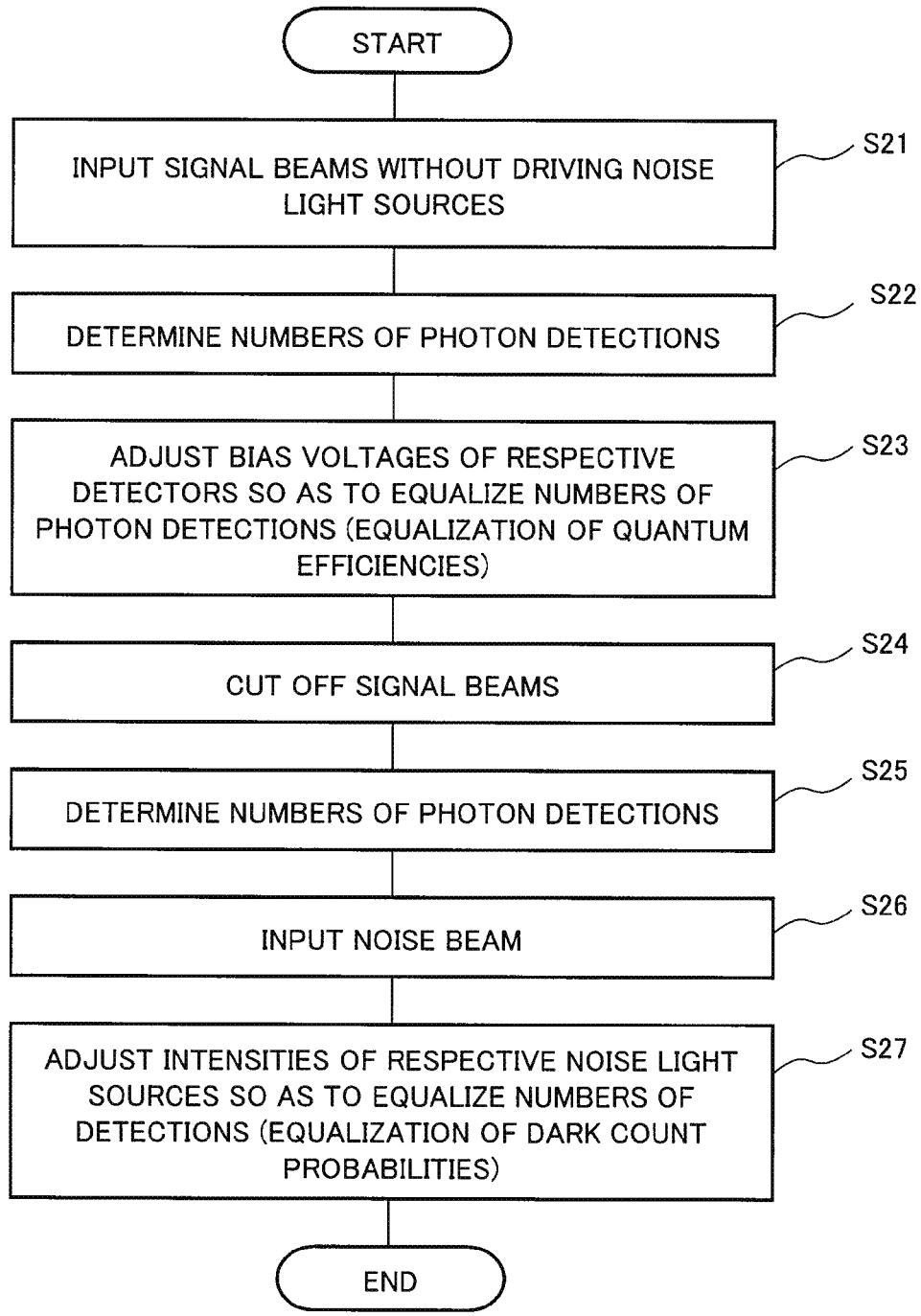
FIG. 7 is a flowchart illustrating a procedure of the fourth exemplary embodiment of the present invention.

FIG. 7 is a flowchart illustrating the above procedure. First, only the signal beams 7 are input to the photon detectors 1 without driving the noise light sources 17 (S21). The numbers of detections of the respective photon detectors 1 are determined in this state (S22). These numbers approximately correspond to quantum efficiencies. In a strict sense, each of the numbers of detections includes dark count, but the influence is so small that the dark count may be ignored. Subsequently, the bias voltages are adjusted so that the numbers of detections of the two respective photon detectors 1 are to be equal (S23). In this way, the quantum efficiencies can be equalized. At this stage, dark count probabilities are different in general due to individual variability of the respective photon detectors 1. Then, the signal light beams 7 are cut off (S24). The numbers of detections of the respective photon detectors 1 are determined in this state (S25). These numbers correspond to the dark count probabilities of the photon detectors 1, and the numbers of detections of the respective photon detectors 1 are not equal in general. Accordingly, the noise light source 17 for the photon detector 1 that has a smaller number of detections is driven and input a noise beam (S26). Then, the light intensities of the noise light sources 17 are adjusted so as to equalize the numbers of photon detections (S27). In this way, the effective dark count probabilities may be equalized. The operation performed on the noise light sources 17 does not affect the quantum efficiencies of the photon detectors 1. Through the above, both quantum efficiencies and dark count probabilities may be equalized at the same time.

In the second exemplary embodiment, the beam intensity adjusting means 5 are used immediately prior to the photon detectors 1, and the smallest optical loss is 0.6 dB or higher, however, in this exemplary embodiment, the optical multiplexers 19 are used, and the optical loss is 0.1 dB or lower. Hence, this exemplary embodiment has the advantage that an improvement of 0.5 dB (approximately 12%) or higher in efficiency may be expected compared with the second and third exemplary embodiments.

Fifth Exemplary Embodiment

Figure 8:
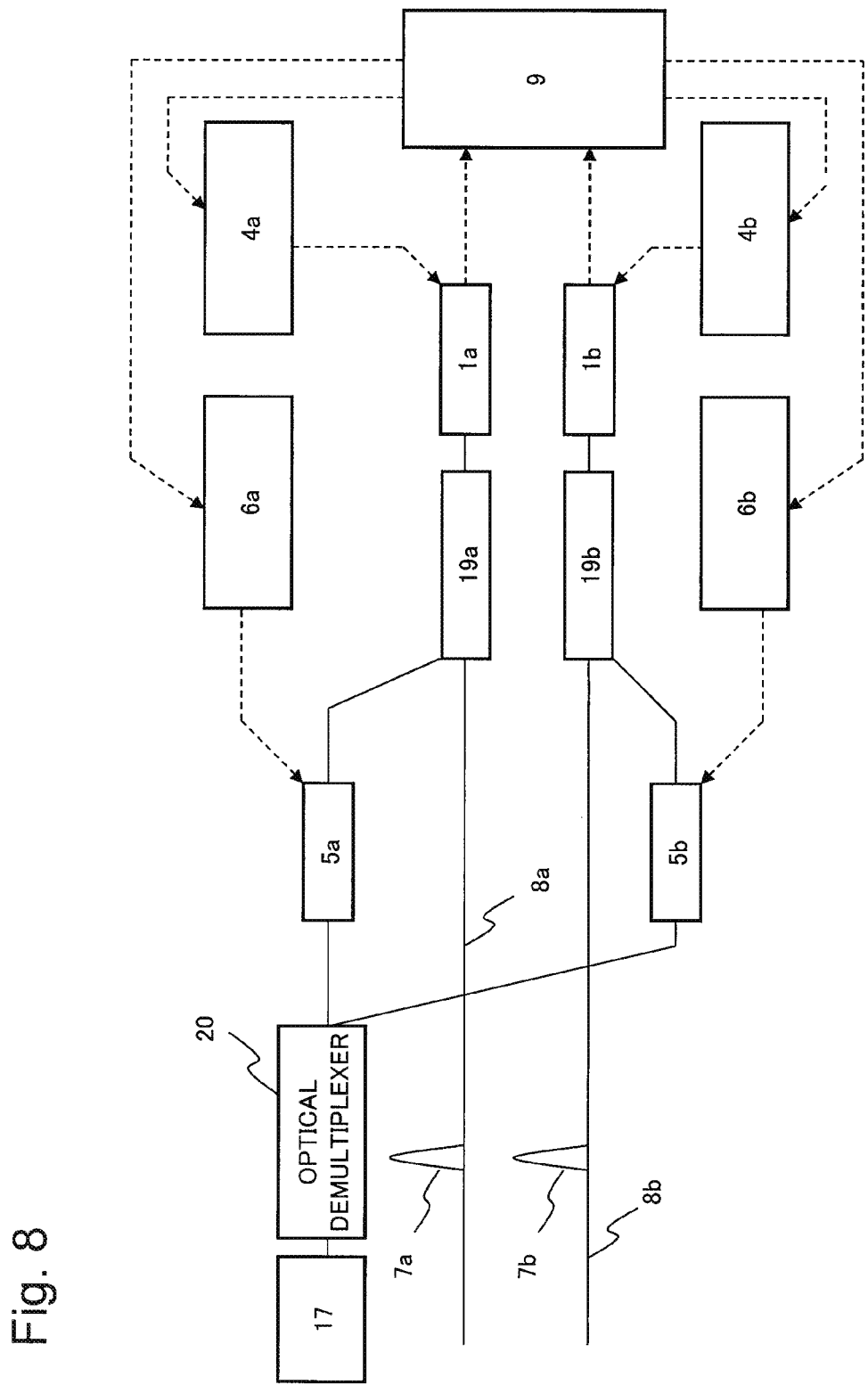
FIG. 8 is a block diagram illustrating a configuration of a fifth exemplary embodiment of the present invention.

In the fourth exemplary embodiment, although the separate noise light sources 17 are provided for the respective detection systems, the number of noise light sources 17 to be provided does not need to correspond to the number of detection systems. FIG. 8 is a block diagram illustrating an optical receiver in which the single noise light source 17 is provided for a detection system configured with dual systems. An optical demultiplexer 20 is provided at a stage subsequent to the single noise light source 17. The beam intensity adjusting means 5a is provided to the path for one of the beams obtained by demultiplexing by the optical demultiplexer 20, and the beam intensity control means 6a for controlling the beam intensity adjusting means 5a is connected the beam intensity adjusting means 5a. An optical multiplexer 19a is provided subsequent to the beam intensity adjusting means 5a and multiplexes a signal beam 7a and a noise beam in this state. A beam emitted from the optical multiplexer 19a is input to the photon detector 1a, and the number of photons is detected. A detection system b, i.e., the other detection system to which the optical demultiplexer 20 emits a beam, has the same configuration.

Figure 9:
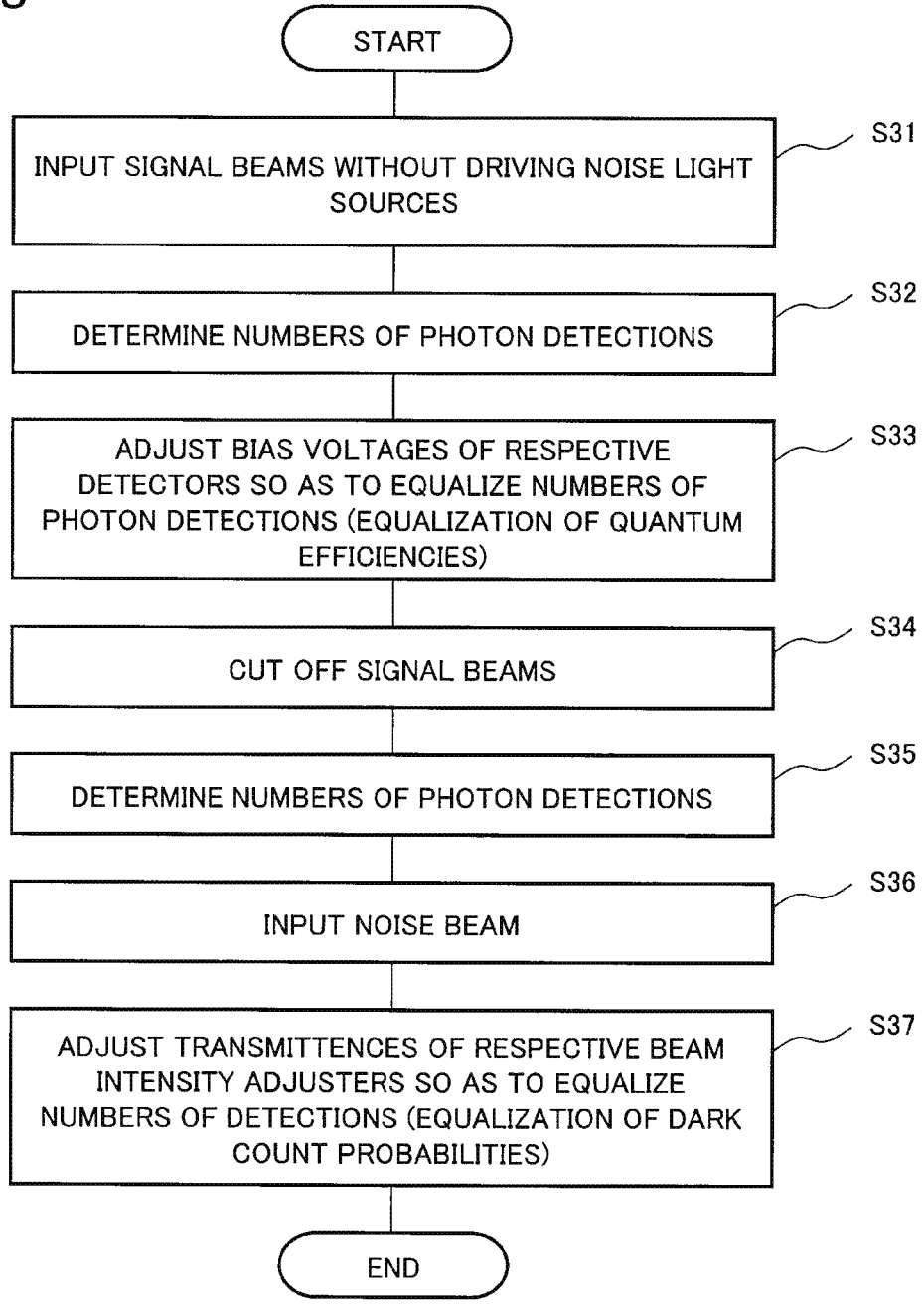
FIG. 9 is a flowchart illustrating a procedure of the fifth exemplary embodiment of the present invention.
Figure 10:
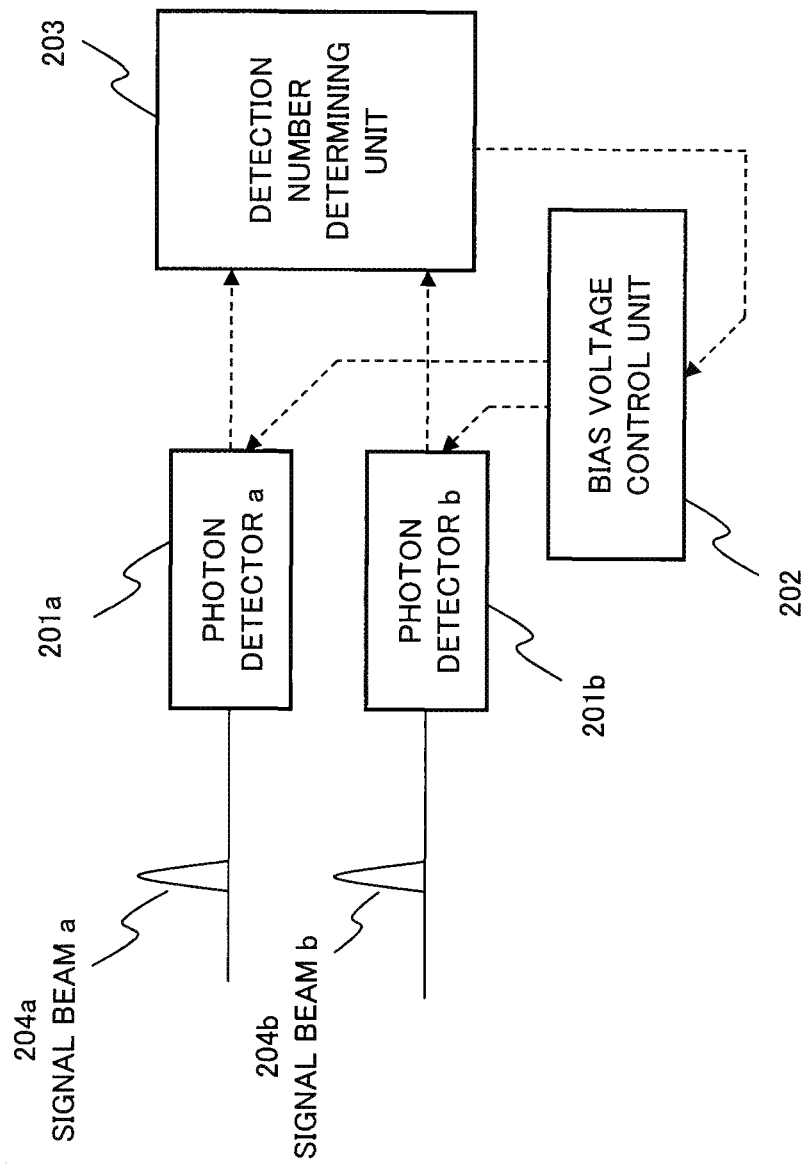
FIG. 10 is a block diagram illustrating a configuration of PTL 1.

Next, methods of equalizing dark count probabilities and equalizing quantum efficiencies of this exemplary embodiment are described. FIG. 9 is a flowchart illustrating a procedure of the methods. First, signal beams 7 are input to the respective photon detectors 1 without driving the noise light sources 17 (S31). Then, the numbers of detections of the respective photon detectors 1 are determined (S32). Thereafter, bias voltages to be applied to the photon detectors 1 by the respective bias voltage control means 4 are adjusted, so that the numbers of detections are equalized (S33). In this way, the quantum efficiencies may be equalized. Subsequently, the signal beams 7 are cut off (S34). The numbers of detections of the respective photon detectors 1 are determined in this state (S35). These numbers correspond to the dark count probabilities of the photon detectors 1, and the numbers of detections of the respective photon detectors 1 are not equal in general. Then, noise beams are input (S36). Thereafter, the respective beam intensity adjusting means 5 are controlled by the respective beam intensity control means 6, so that the numbers of detections of the respective photon detectors 1 are adjusted to be equalized (S37). In this way, both the quantum efficiencies and the dark count probabilities may be equalized at the same time.

In the above-described exemplary embodiments, although methods of adjusting quantum efficiencies and dark count probabilities by use of bias voltages of the photon detectors 1 are provided as an example, the quantum efficiencies and dark count probabilities may be adjusted by using, for example, the amplitudes, durations, or detection threshold values of gate pulses used for activating the photon detectors 1.

In the above-described exemplary embodiments, description is given of a case of including two photon detectors 1, however, it is possible to implement the present invention with substantially the same configuration and procedure and to obtain corresponding effects, even in a case of including three or more photon detectors 1.

(Supplementary Note 1)
An optical receiver including:
a plurality of photon detectors;
a first equalizing means that equalizes either dark count probabilities or quantum efficiencies of the plurality of photon detectors; and
a second equalizing means that equalizes the other ones without affecting the equalization by the first equalizing means.

(Supplementary Note 2)
The optical receiver according to Supplementary Note 1, wherein
the first equalizing means is a means that equalizes the dark count probabilities, and
the second equalizing means is a means that equalizes the quantum efficiencies.

(Supplementary Note 3)
The optical receiver according to Supplementary Note 1, wherein
the first equalizing means is a means that equalizes the quantum efficiencies, and
the second equalizing means is a means that equalizes the dark count probabilities.

(Supplementary Note 4)
The optical receiver according to any one of Supplementary Note 1 to Supplementary Note 3, wherein the photon detectors are avalanche photodiodes.

(Supplementary Note 5)
The optical receiver according to any one of Supplementary Note 1 to Supplementary Note 4, wherein the photon detectors are superconducting single photon detectors.

(Supplementary Note 6)
The optical receiver according to Supplementary Note 2, wherein the first equalizing means is a bias voltage control means that controls a bias voltage to be applied to each of the photon detectors, and
the second equalizing means is a variable-beam-intensity adjuster that adjusts the intensity of a signal beam to be input to each of the photon detectors.

(Supplementary Note 7)
The optical receiver according to Supplementary Note 3, wherein
the first equalizing means is a bias voltage control means that controls a bias voltage to be applied to each of the photon detectors, and
the second equalizing means includes a noise light source that emits a noise beam, noise beam inputting means each of which inputs the noise beam to a corresponding one of the photon detectors, and noise beam intensity adjusting means each of which adjusts intensity of the noise beam which is input to the photon detectors from the noise beam inputting means.

(Supplementary Note 8)

The optical receiver according to Supplementary Note 7, wherein each of the noise beam inputting means includes a multiplexing means that multiplexes the noise beam and a signal beam.

(Supplementary Note 9)

The optical receiver according to Supplementary Note 7 or Supplementary Note 8, wherein the noise beam intensity adjusting means is a variable-beam-intensity adjuster that is provided between a corresponding one of the noise beam inputting means and a corresponding one of the photon detectors.

(Supplementary Note 10)

The optical receiver according to Supplementary Note 9, including a demultiplexing means that leads the beam from the respective noise light source to the noise beam inputting means.

(Supplementary Note 11)

The optical receiver according to Supplementary Note 7, wherein the noise light source is provided for each of the photon detectors, and the beam intensity adjusting means is a noise-light-source beam intensity adjusting means each of which adjusts beam intensity of a corresponding one of the noise light sources.

(Supplementary Note 12)

A control method of an optical receiver including a plurality of photon detectors, the method including:

equalizing dark count probabilities of the photon detectors; and equalizing quantum efficiencies of the photon detectors without affecting the dark count probabilities.

(Supplementary Note 13)

The control method of an optical receiver according to Supplementary Note 12, wherein equalizing the dark count probabilities corresponds to adjusting bias voltages to be applied to the photon detectors.

(Supplementary Note 14)

The control method of an optical receiver according to Supplementary Note 12 or Supplementary Note 13, wherein equalizing the quantum efficiencies corresponds to adjusting a variable-beam-intensity adjuster provided to an input side of the photon detectors.

(Supplementary Note 15)

A control method of an optical receiver including a plurality of photon detectors, the method including:

equalizing quantum efficiencies of the photon detectors; and equalizing dark count probabilities of the photon detectors without affecting the quantum efficiencies.

(Supplementary Note 16)

The control method of an optical receiver according to Supplementary Note 15, wherein equalizing the quantum efficiencies corresponds to adjusting bias voltages to be applied to the photon detectors.

(Supplementary Note 17)

The control method of an optical receiver according to Supplementary Note 15 or Supplementary Note 16, wherein equalizing the dark count probabilities corresponds to inputting noise beams to the photon detectors and adjusting intensities of the noise beams.

(Supplementary Note 18)

The control method of an optical receiver according to Supplementary Note 17, wherein adjusting intensities of the noise beams corresponds to adjusting beam intensities of noise light sources.

(Supplementary Note 19)

The control method of an optical receiver according to Supplementary Note 17, wherein adjusting intensities of the noise beams corresponds to adjusting beam intensities of noise beams by variable-beam-intensity adjusters.

This application claims priority of Japanese Patent Application No. 2013-036506 filed on Feb. 27, 2013, the entire disclosure of which is incorporated herein.

REFERENCE SIGNS LIST 1, 201 Photon detector
2 First equalizing means
3 Second equalizing means
4, 202 Bias voltage control means
5 Beam intensity adjuster
6 Beam intensity control means
7, 204 Signal beam
8 Optical transmission path
9, 203 Detection number determining means
10 APD
11 Level adjuster
12 Bias power supply
13 Pulse counter
14 Control means
15 SSPD
16 Cryostat
17 Noise light source
18 Noise light source control means
19 Optical multiplexer
20 Optical demultiplexer

What is claimed is:

1. An optical receiver comprising: a plurality of photon detectors; a first equalizing unit which equalizes dark count probabilities of the plurality of photon detectors by adjusting bias voltage of at least one of the photon detectors, and a second equalizing unit which equalizes quantum efficiencies of the plurality of photon detectors by adjusting the intensity of an incident beam of at least one of the photon detectors.

2. The optical receiver according to claim 1, wherein the first equalizing unit is a bias voltage control unit which controls a bias voltage to be applied to each of the photon detectors, and the second equalizing unit is a variable-beam-intensity adjuster which adjusts the intensity of a signal beam to be input to each of the photon detectors.

3. The optical receiver according to claim 1, wherein the first equalizing unit is a bias voltage control unit which controls a bias voltage to be applied to each of the photon detectors, and the second equalizing unit includes a noise light source which emits a noise beam, noise beam inputting units each of which inputs the noise beam to a corresponding one of the photon detectors, and noise beam intensity adjusting units each of which adjusts intensity of the noise beam which is input to the photon detectors from the noise beam inputting unit.

4. The optical receiver according to claim 3, wherein each of the noise beam inputting unit includes a multiplexing unit which multiplexes the noise beam and a signal beam.

5. The optical receiver according to claim 3, wherein the noise beam intensity adjusting unit is a variable-beam-intensity adjuster which is provided to an input side of the photon detectors.

6. The optical receiver according to claim 3, wherein the noise light source is provided for each of the photon detectors, and each beam intensity adjusting unit adjusts beam intensity of a corresponding one of the noise light sources.

7. The optical receiver according to claim 1, wherein the first equalizing unit comprises a bias power supply and a level adjuster, and wherein the second equalizing unit comprises another bias power supply and another level adjuster.

8. A control method of an optical receiver including a plurality of photon detectors, the method comprising: equalizing dark count probabilities of the photon detectors by adjusting bias voltage of at least one of the photon detectors; and equalizing quantum efficiencies of the photon detectors by adjusting the intensity of an incident beam of at least one of the photon detectors.

* * * * *